United States Patent
Sarh et al.

(10) Patent No.: US 9,281,108 B2
(45) Date of Patent: Mar. 8, 2016

(54) CLAMP ASSEMBLY INCLUDING PERMANENT MAGNETS AND COILS FOR SELECTIVELY MAGNETIZING AND DEMAGNETIZING THE MAGNETS

(71) Applicant: The Boeing Company, Chicago, IL (US)

(72) Inventors: Branko Sarh, Huntington Beach, CA (US); Daniela Lucia Rus, Weston, MA (US); Andrew Dominic Marchese, Concord, MA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/515,614

(22) Filed: Oct. 16, 2014

(65) Prior Publication Data
US 2015/0035632 A1  Feb. 5, 2015

Related U.S. Application Data

(62) Division of application No. 13/460,741, filed on Apr. 30, 2012, now Pat. No. 8,912,872.

(51) Int. Cl.
| H01F 7/02 | (2006.01) |
|---|---|
| B25B 11/00 | (2006.01) |
| B25J 15/06 | (2006.01) |
| H01F 7/04 | (2006.01) |
| H01F 7/18 | (2006.01) |

(52) U.S. Cl.
CPC ............ *H01F 7/0226* (2013.01); *B25B 11/002* (2013.01); *B25J 15/0608* (2013.01); *H01F 7/04* (2013.01); *H01F 7/18* (2013.01); *H01F 7/1805* (2013.01)

(58) Field of Classification Search
CPC .......... B25B 11/002; B25J 15/06; H01F 7/04; H01F 7/18; H01F 7/0226; H01F 7/0252; H01F 7/0257; B23Q 3/1543; B23Q 3/1546
USPC ................. 335/285–295; 361/144; 901/40–41
See application file for complete search history.

(56) References Cited

U.S. PATENT DOCUMENTS

| 1,339,553 | A | | 5/1920 | Dunbar |
|---|---|---|---|---|
| 3,131,336 | A | | 4/1964 | Hochwald et al. |
| 4,471,331 | A | * | 9/1984 | Wyatt .............................. 335/285 |
| 4,990,805 | A | | 2/1991 | Zieve |
| 5,621,963 | A | | 4/1997 | Givler |
| 6,357,101 | B1 | | 3/2002 | Sarh et al. |
| 6,636,153 | B1 | | 10/2003 | Barton et al. |
| 6,652,014 | B2 | | 11/2003 | Schmalz et al. |
| 6,905,291 | B2 | | 6/2005 | Day et al. |
| 7,088,210 | B2 | | 8/2006 | Day et al. |

(Continued)

FOREIGN PATENT DOCUMENTS

| JP | 59153723 A | * | 9/1984 |
|---|---|---|---|
| SU | 1331775 A | * | 8/1987 |

*Primary Examiner* — Mohamad Musleh
(74) *Attorney, Agent, or Firm* — Smith Moore Leatherwood LLP; Thomas W. Epting; Matthew S. Bedsole (57) ABSTRACT

A clamp assembly comprises a first clamp including a plurality of magnet devices. Each magnet device includes a permanent magnet and a coil surrounding the permanent magnet. The clamp assembly further comprises a controller for pulsing the coils to selectively magnetize and demagnetize the permanent magnets.

14 Claims, 10 Drawing Sheets

(56) References Cited

U.S. PATENT DOCUMENTS

| | | |
|---|---|---|
| 7,148,776 B2 | 12/2006 | Day et al. |
| 7,675,395 B2 | 3/2010 | Day et al. |
| 2007/0290780 A1 | 12/2007 | Tiberghien et al. |
| 2010/0071192 A1* | 3/2010 | Sarh et al. ............ 29/525.06 |
| 2010/0092587 A1 | 4/2010 | Kimura |
| 2011/0037547 A1 | 2/2011 | Cardone et al. |
| 2014/0043123 A1 | 2/2014 | Lee et al. |

* cited by examiner

| PM | PROCESS CONFIGURATIONS | | | | |
|----|---|---|---|---|---|
|    | A | B | C | D | E |
| M1 | ● | ● | ● | ● | ● |
| M2 | ● |   | ● |   | ● |
| M3 | ● |   |   | ● |   |
| M4 | ● | ● | ● | ● |   |
| M5 | ● |   | ● |   |   |
| M6 | ● |   |   | ● |   |

CLAMP ASSEMBLY INCLUDING PERMANENT MAGNETS AND COILS FOR SELECTIVELY MAGNETIZING AND DEMAGNETIZING THE MAGNETS

This application is a divisional application and claims benefit of U.S. nonprovisional application Ser. No. 13/460,741, filed Apr. 30, 2012, and the entirety of the foregoing nonprovisional application is incorporated herein by reference.

BACKGROUND

Consider the example of an assembly operation in which a stack of parts are fastened together. The parts are clamped together with hundreds of pounds of force, while fasteners such as rivets or bolts are inserted into the stack and then terminated.

In this example, electromagnets are used to apply the clamping force. For instance, an array of electromagnets may be positioned on one side of the stack, while a metal plate is positioned on an opposite side of the stack. When the electromagnets are actuated, they create a magnetic field whose flux lines flow through the plate and move the plate towards a least reluctance position (towards the electromagnets). As a result, the parts are clamped together.

To obtain hundreds of pounds of clamping force, large electromagnets and high currents are used. High current is applied constantly during a clamping cycle. During a long clamping cycle, total energy usage is extremely high.

A cooling system may be needed to cool the electromagnets to avoid overheating during long clamping cycles. Air or another cooling fluid may be flowed through channels between copper windings of the electromagnets. Heat carried away by the fluid may be discharged by a heat exchanger or other secondary system.

SUMMARY

According to an embodiment herein, a clamp assembly comprises a first clamp including a plurality of magnet devices. Each magnet device includes a permanent magnet and a coil surrounding the permanent magnet. The clamp assembly further comprises a controller for pulsing the coils to selectively magnetize and demagnetize the permanent magnets.

According to another embodiment herein, a system comprises a robot end effector including a plurality of magnet devices about a process axis. Each magnet device includes a permanent magnet and a coil surrounding the permanent magnet. The system further comprises a controller for pulsing the coils to selectively magnetize and demagnetize the permanent magnets.

According to another embodiment herein, a method of clamping a stack comprises positioning permanent magnets against a first surface of the stack, placing a flux-conducting structure against a second surface of the stack, and applying external magnetic field pulses to the permanent magnets to magnetize and demagnetize the permanent magnets.

These features and functions may be achieved independently in various embodiments or may be combined in other embodiments. Further details of the embodiments can be seen with reference to the following description and drawings.

DETAILED DESCRIPTION

Figure 1:
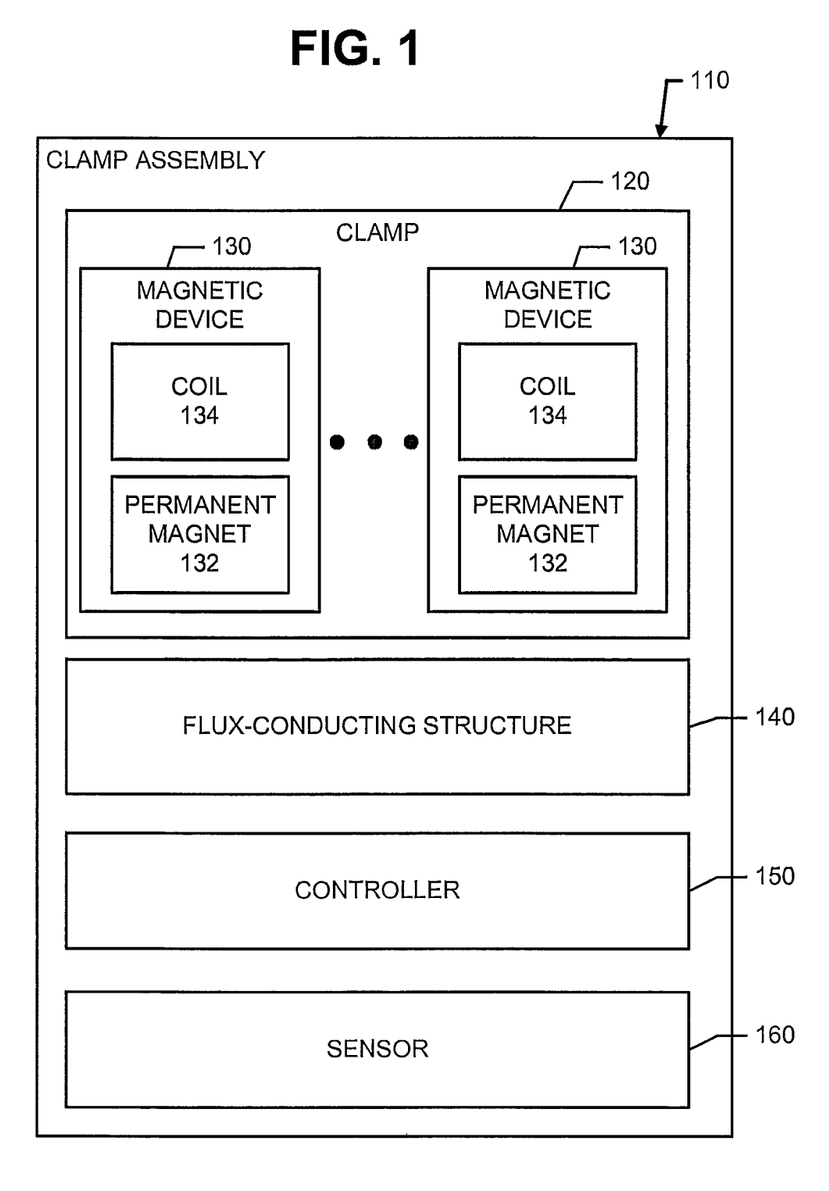
FIG. 1 is an illustration of a clamp assembly including permanent magnets and coils for selectively magnetizing and demagnetizing the magnets to perform magnetic clamping.

Reference is made to FIG. 1, which illustrates a clamp assembly 110 for magnetically clamping a stack. The stack may include one or more parts. Composition of the stack is not limited to any particular material.

The clamp assembly 110 includes a clamp 120, which includes a plurality of magnet devices 130. Each magnet device 130 includes a permanent magnet 132 and a coil 134 surrounding the permanent magnet 132. The coils 134 are used to selectively magnetize and demagnetize their corresponding magnets 132.

The clamp assembly 110 further includes a flux-conducting structure 140 that forms an air gap with the magnets 132 of the clamp 120. During a clamping operation, the stack is located in the air gap, between the permanent magnets 132 and the flux-conducting structure 140. When the magnets 132 are magnetized, the flux-conducting structure 140 is drawn towards the clamp 120, whereby a clamping force is applied to the stack. When the magnets 132 are demagnetized, the clamping force is removed.

In some embodiments, the flux-conducting structure 140 includes a plate made of a flux-conducting material (e.g., steel). In other embodiments, the flux-conducting structure 140 includes a second clamp, which includes a corresponding plurality of magnetic devices. Permanent magnets in the first and second clamps are aligned to form the air gap. In still other embodiments, the flux-conducting structure 140 may be a flux-conducting part in the stack (e.g., the flux-conducting part that is furthest from the clamp 120).

Figure 2:
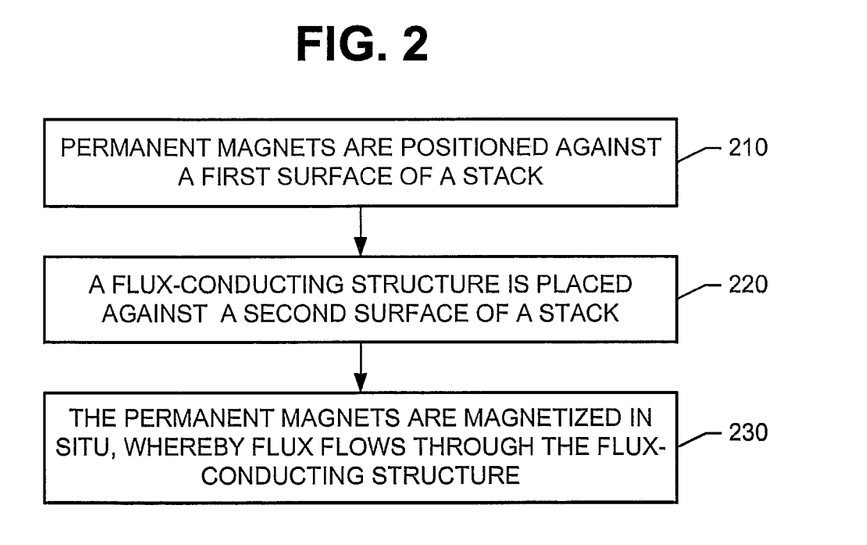
FIG. 2 is an illustration of a method of using the clamp assembly to perform magnetic clamping of a stack.

Additional reference is made to FIG. 2, which illustrates a method of using the clamp assembly 110 to perform magnetic clamping of a stack. At block 210, the permanent magnets 132 are positioned over a first surface of the stack. Typically, the permanent magnets 132 will be demagnetized before they are placed over the first surface.

At block 220, the flux-conducting structure 140 is placed against a second surface of the stack. At block 230, the permanent magnets 132 are magnetized in situ. Flux flows through the flux-conducting structure 140.

Figure 3:
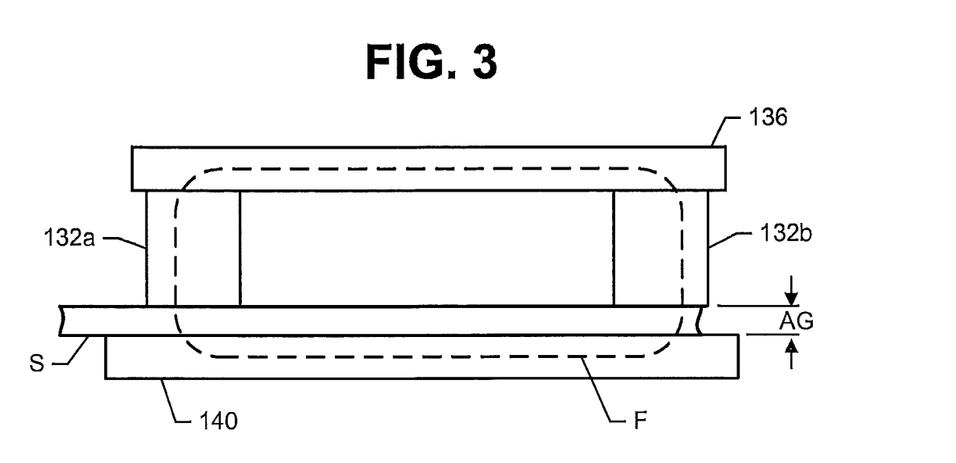
FIG. 3 is an illustration of flux flow during magnetic clamping.

As illustrated in FIG. 3, when the magnets 132 are magnetized, magnetic flux (F) flows from one magnet 132a, through the flux-conducting structure 140, and to another magnet 132b. (A keeper 136 may be magnetically coupled to the magnets 132a and 132b to complete the magnetic circuit.) The flux-conducting structure 140 is moved towards a least reluctance position, which is towards the clamp 120. As a result, a clamping force is applied to a stack S, which is located in the air gap AG.

The clamp assembly 110 further includes a controller 150 for pulsing the coils 134 to selectively magnetize and demagnetize the permanent magnets 132. The controller 150 supplies coil current in one direction to magnetize the magnets 132, and it supplies coil current in an opposite direction to demagnetize the magnets 132. When supplied with current, a coil 134 establishes an external field of sufficient intensity to either promote or demote magnetic domain alignment.

Pulse width is short relative to the duration of a clamping cycle. For instance, the pulse width may be on the order of milliseconds, whereas the clamping force during a cycle may be applied for ten seconds (or longer).

Amplitude and duration of the coil current are selected to create a magnetic field that changes the magnetization of the magnets 132. The amplitude of the coil current might be higher than that of an electromagnet that applies the same clamping force. However, overall power consumption is lower, since the current is applied to coils 134 for milliseconds, whereas current would flow through a conventional electromagnet for tens of seconds (or longer). Moreover, a cooling system is not needed to cool the coils 134.

Figure 4A:
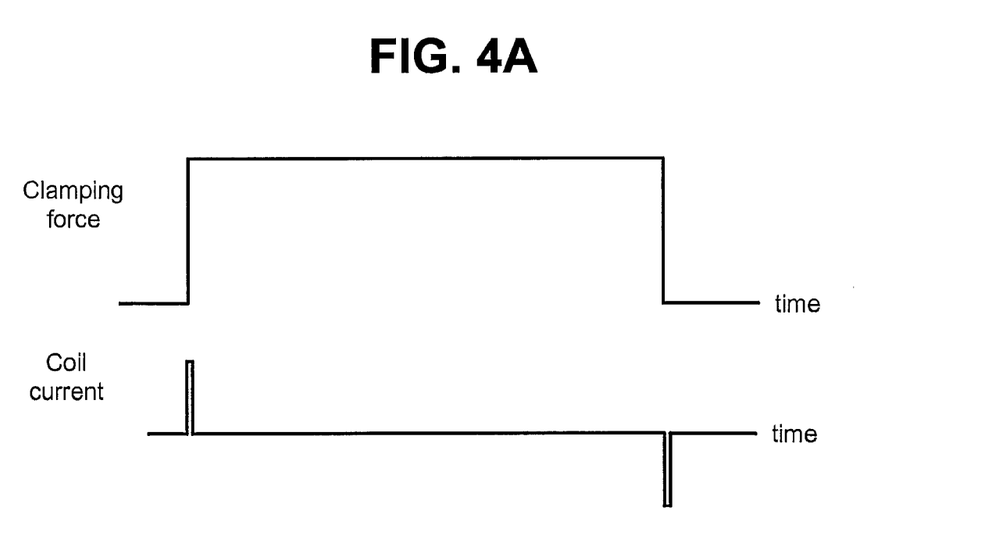
FIGS. 4A and B are illustrations of pulsing the coils to selectively magnetize and demagnetize the permanent magnets.
Figure 4B:
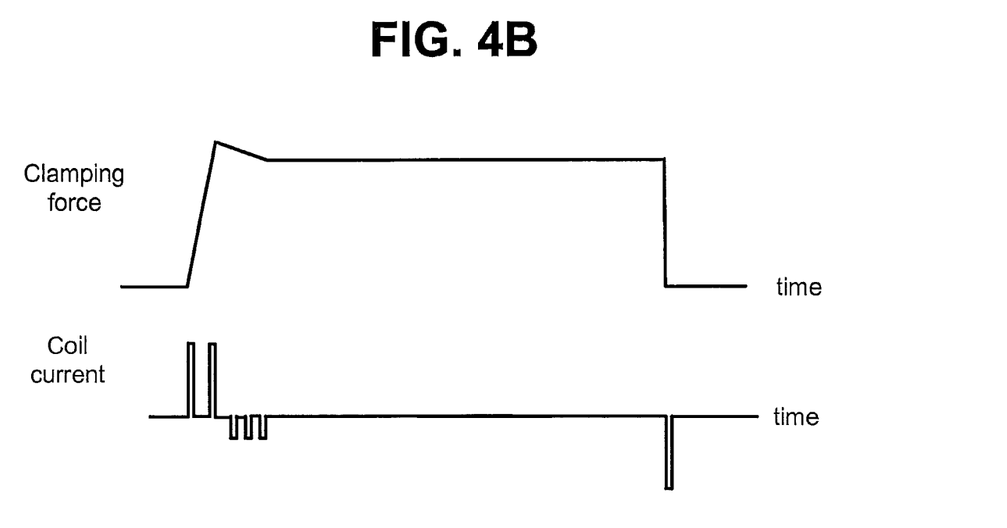

A single pulse of coil current may be sent to a coil, or multiple pulses may be sent. FIG. 4A shows a single pulse. FIG. 4B shows train of pulses of different magnitudes and directions.

The clamping force may be maximized by maximizing the flux field. The flux field is a function of coil current amplitude and pulse width, the number of magnets, and the number of winding turns per coils. The clamping force is also a function of size of the air gap.

In some embodiments, the magnets 132 may include iron alloy. For example, the permanent magnets may be iron alloy magnets such as AlNiCo magnets. However, other embodiments may use permanent magnets having higher or lower magnetic flux density. For instance, other embodiments may use rare earth magnets.

The external field may saturate the magnetic material of a permanent magnet 132 to completely magnetize the material in either direction (to achieve maximum clamping force). However, to demagnetize or essentially nullify the magnetic field produced by a permanent magnet 132, the external field may be smaller in magnitude and it may be applied in the opposite direction to what exists.

A continuum of clamping forces may be achieved by applying an external field below the saturating magnitude. For example, all permanent magnets 132 in the clamp assembly 110 are magnetized to create a uniform force distribution, but the magnetization is only partial so as not to exert a full clamping force. Amplitude and pulse width of the coil current may be controlled to achieve a specific clamping force per magnet device.

The clamp assembly 110 may include a sensor 160 for sensing the actual clamping force. As a first example, a force sensor (load cell) may measure the amount of actual clamping force generated. As a second example, a hall effect sensor may measure the magnetic flux density in the air gap, and the actual clamping force may be calculated from this measurement.

In some embodiments, the controller 150 may include a closed loop control for controlling the actual clamping force. For example, the closed loop control may vary the clamping force until the error between actual and desired clamping forces is within a threshold. Consider the pulse train in FIG. 4B. Two initial pulses cause full magnetization of all magnets, resulting in maximum clamping force. Subsequent pulses of reverse polarity and lower amplitudes are used to reduce the clamping force from maximum force to a lower desired force.

In other embodiments, the controller 150 may use an open loop control for controlling the clamping force. For example, a lookup table may be used to determine the magnitude, duration and direction of coil current to achieve a desired clamping force.

FIGS. 5 to 13 illustrate different embodiments of clamp assemblies. In these embodiments, the permanent magnets are arranged symmetrically about a process axis. Such an arrangement enables uniform clamping force to be applied to a stack, while a manufacturing operation (e.g., drilling, riveting) is performed on the stack along the process axis.

Figure 5:
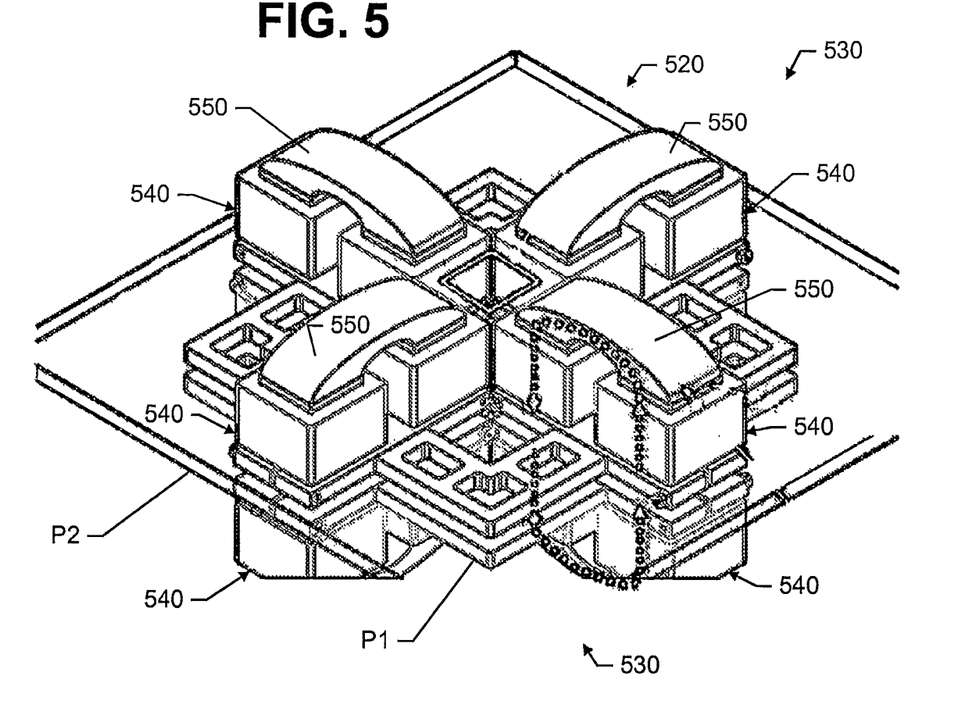
FIGS. 5 and 6 are illustrations of an embodiment of a clamp assembly.
Figure 6:
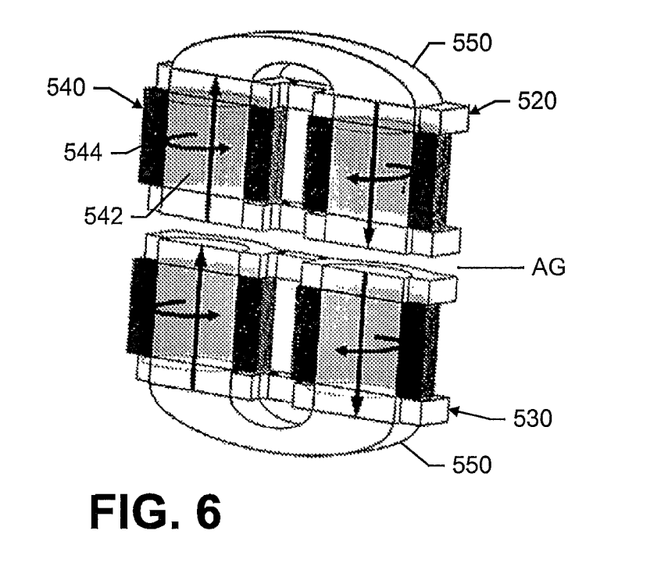

Reference is made to FIGS. 5 and 6, which illustrate a clamp assembly 510 including upper and lower clamps 520 and 530 for clamping a stack. The stack includes an upper part (P1) and a lower part (P2).

Each clamp 520 and 530 includes four pairs of magnet devices 540, with each device 540 including a permanent magnet 542 and a coil 544. The magnet devices 540 are arranged radially about a process axis (not illustrated). Air gaps are defined by first ends of opposing magnets of 542 of the upper and lower clamps 520 and 530. For each pair of magnet devices 540, a keeper 550 magnetically couples second ends of the magnets 542. The keepers 550 may be made of a low carbon steel or other flux-conducting material.

FIG. 6 depicts a cross section of a pair of magnet devices 540 in the upper clamp 520 and a corresponding pair of magnet devices 540 in the lower clamp 530. FIG. 6 also illustrates a flux pathway (straight arrows) during clamping. Magnetic flux density within the air gap AG and corresponding clamping force between the magnet devices 540 is controlled by the magnitude, direction, and sequence of current pulses (circular arrows) through the coils 544.

Figure 7:
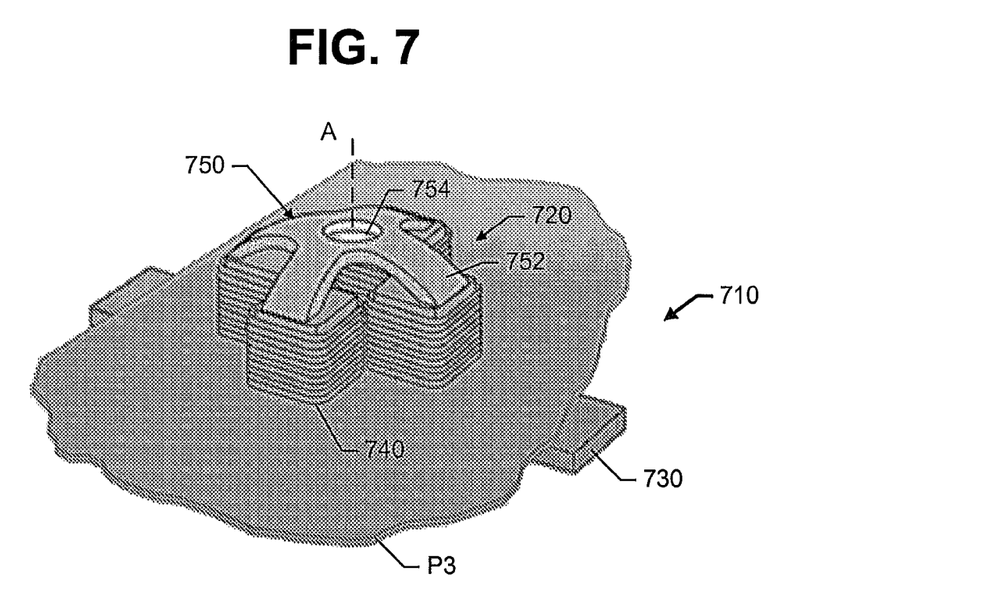
FIGS. 7 and 13 are illustrations of additional embodiments of clamp assemblies.

Reference is made to FIG. 7, which illustrates a clamp assembly 710 including a clamp 720 and metal plate 730 for clamping a single part P3. The clamp 720 includes two pairs of magnet devices 740 disposed symmetrically about a process axis (A). Each magnet device 740 has a square configuration, including a square-shaped permanent magnet and a square-shaped coil. The permanent magnets are connected by a single keeper 750, which has arms 752 extending radially outward from the process axis (A). An opening 754 in the keeper 750 allows a manufacturing operation to be performed within the clamped portion of the part (P3).

Figure 8:
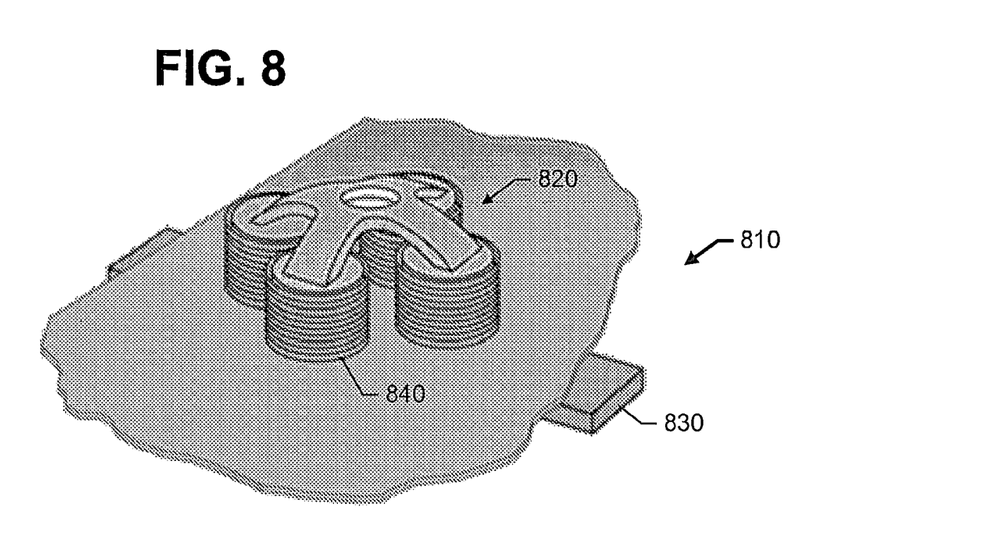

FIG. 8 illustrates a clamp assembly 810 including a metal plate 830 and a clamp 820 that are similar to the embodiment illustrated in FIG. 7. In the embodiment of FIG. 8, however, the magnet devices 840 of the clamp 820 have cylindrical configurations (the permanent magnet and coil of each magnetic device 840 are cylindrical). A coil having a cylindrical configuration may be easier to wind, and it may have lower tension in its windings.

Figure 9:
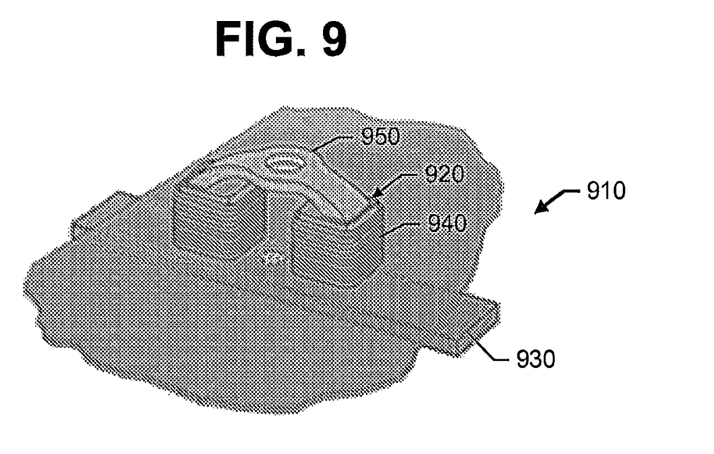
Figure 10:
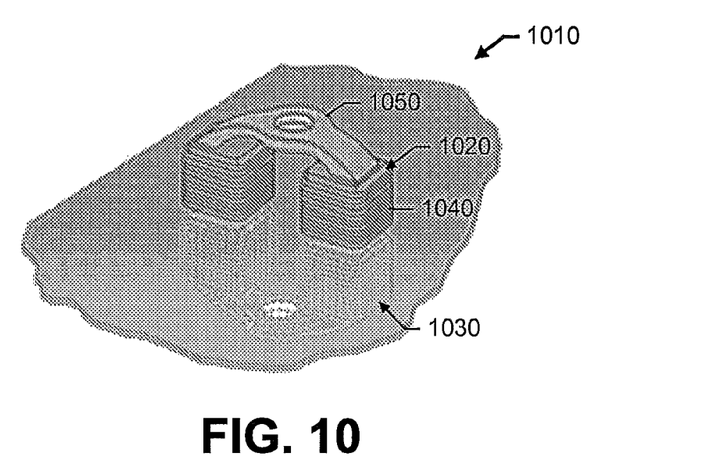

FIGS. 9 and 10 illustrate clamps 920 and 1020, each having a single pair of magnet devices 940 and 1040, and a keeper 950 and 1050 for providing a flux path between ends of the devices' permanent magnets. The clamp assembly 910 of FIG. 9 includes the clamp 920 and a steel bar 930. The clamp assembly 1010 of FIG. 10 includes the clamp 1020, and a corresponding lower clamp 1030. Permanent magnets of the lower clamp 1030 are aligned with and form an air gap with the permanent magnets of the upper clamp 1020. A higher clamping force may be achieved by using the lower clamp 1030 instead of the steel bar 930. On the other hand, cost and complexity of the clamp 910 of FIG. 9 is lowered by use of the steel bar 930. In addition, positioning accuracy is not as stringent, since the steel bar 930 doesn't have to be aligned with the permanent magnets of the clamp 920.

Figure 11:
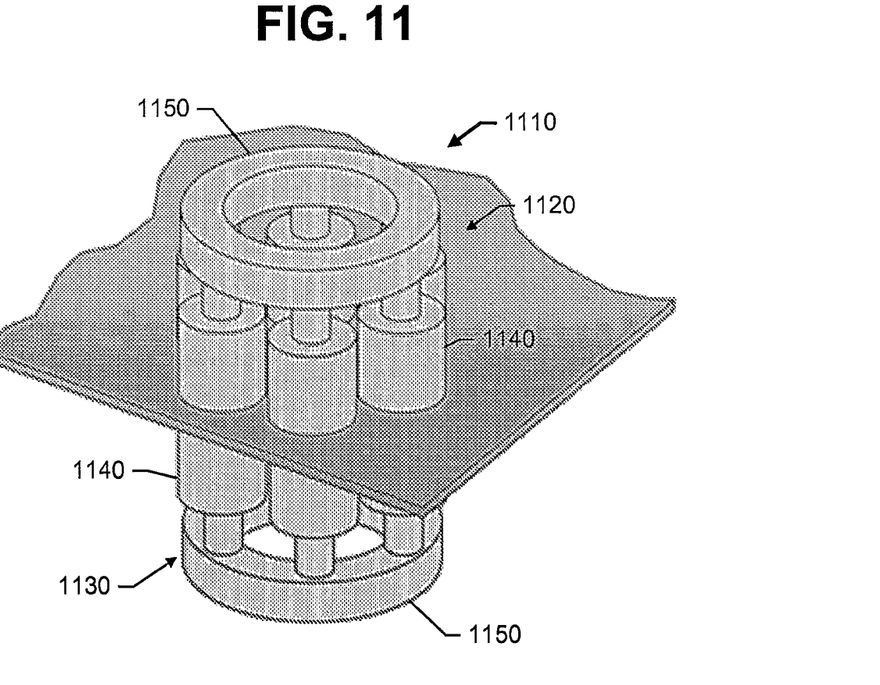

FIG. 11 illustrates a clamp assembly 1110 including upper and lower clamps 1120 and 1130, where each clamp 1120 and 1130 includes a plurality of magnet devices 1140 arranged in a circular pattern. Each clamp 1120 and 1130 further includes a circular keeper 1150 for magnetically coupling the permanent magnets of the magnet devices 1140. In other embodiments, a flux-conducting plate may be used instead of the clamp 1130.

Figure 12:
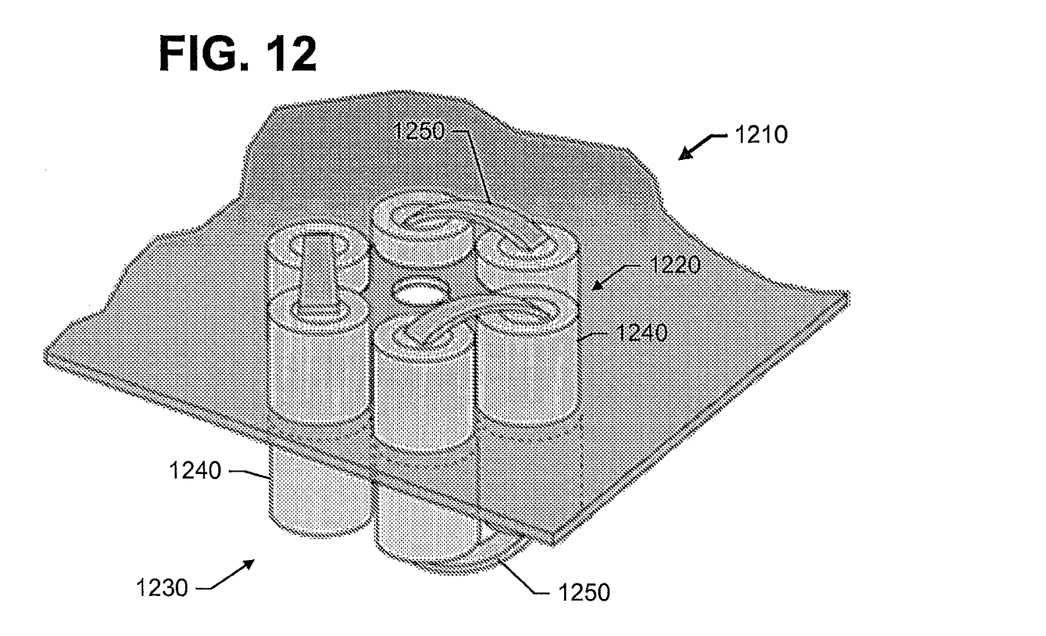

FIG. 12 illustrates a clamp assembly 1210 including upper and lower clamps 1220 and 1230, with each clamp 1220 and 1230 including a circular arrangement of magnet devices 1240. Each clamp 1220 and 1230 further includes a plurality of keepers 1250. Each keeper 1250 magnetically couples a pair of the permanent magnets. FIG. 12 shows three pairs of magnetic devices 1240 in each clamp 1220 and 1230.

Figure 13:
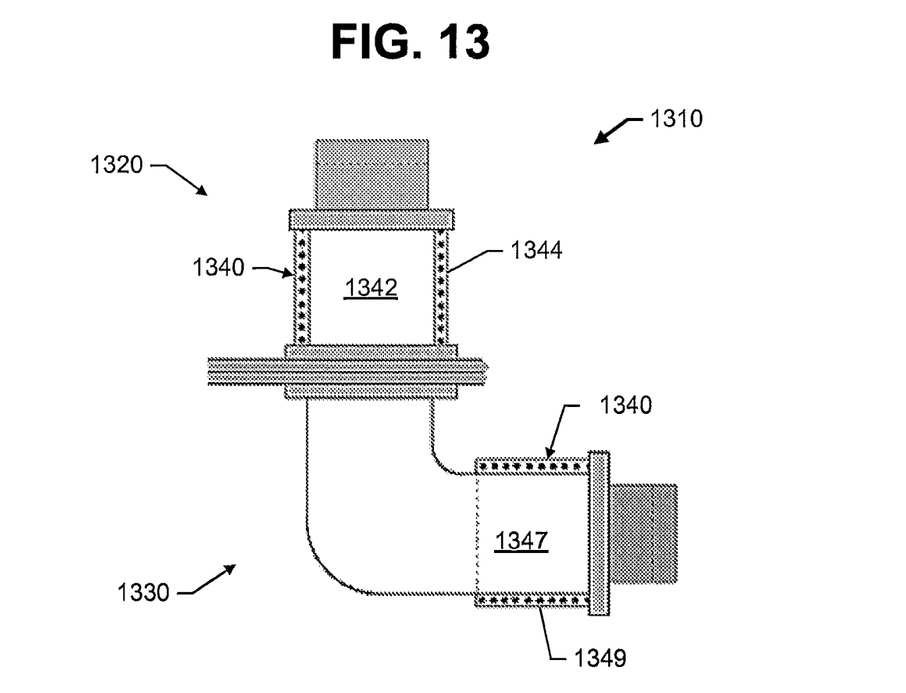

FIG. 13 illustrates a clamp assembly 1310 including upper and lower clamps 1320 and 1330. The upper clamp 1320 includes a plurality of magnetic devices 1340 having permanent magnets 1342 that are arranged parallel to a process axis (not shown). Coils 1344 are wound around the permanent magnets 1342. The lower clamp assembly 1330 includes a plurality of magnet devices 1345 whose permanent magnets 1347 have bends. One end of each bent permanent magnet 1345 is aligned with and forms an air gap with a permanent magnet 1342 of the upper clamp 1320. A coil 1349 is wound around the other end of each bent permanent magnet 1347. This arrangement reduces the profile of the lower clamp 1330 and enables the clamp assembly 1310 to be used in tighter spaces. The clamp assembly profile may be further reduced by using bent permanent magnets in the upper clamp, or by using a metal plate instead of the upper clamp 1320.

Control of a clamp assembly will now be discussed. Pulse magnitude or duration or both may be modulated during magnetization to alter the peak current attained by the pulse. This, in turn, produces external fields of different strengths. Thus, by varying pulse magnitude and/or duration, a continuum of clamping forces may be produced.

Moreover, since each permanent magnet can be selectively magnetized and demagnetized, different regions of the stack can be clamped.

Figure 14A:
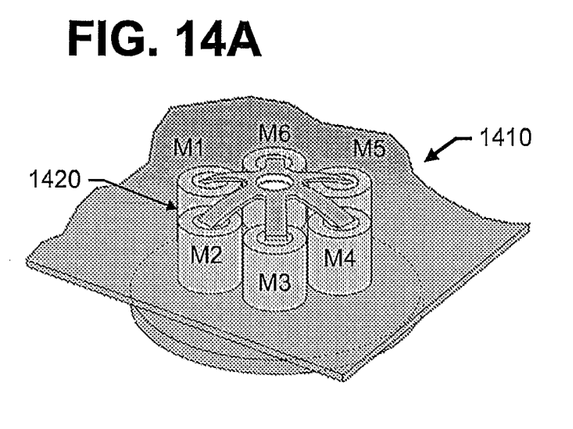
FIG. 14A is an illustration of a clamp assembly having six magnet devices.
Figure 14B:
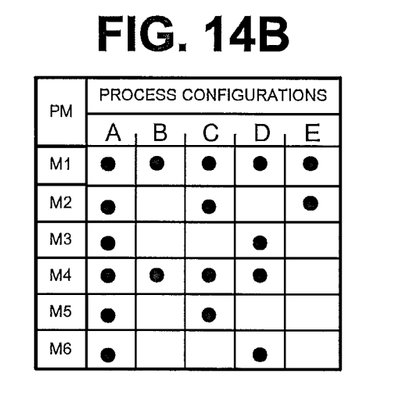
FIG. 14B is an illustration of a clamp assembly having six magnet devices.

Reference is now made to FIG. 14A, which illustrates a clamp assembly 1410 including a clamp 1420 having six magnet devices, and FIG. 14B, which illustrates different process configurations A to E for the clamp assembly 1410. The magnet devices are labeled M1 to M6 in a counterclockwise order. If a large clamping area and force are desired, all six magnet devices M1 to M6 are energized (process configuration A). If only a smaller clamping area is needed, fewer magnet devices are energized. For example, magnet devices M1 and M4 are magnetized while magnet devices M2, M3, M5 and M6 are demagnetized (process configuration B).

In process configurations A, B, C and D, the clamping force is applied on opposite sides of the process axis. The clamping force may be symmetric about the process axis if all magnets have same magnetization, or the clamping force may be non-symmetric if at least one of the magnets has a different magnetization.

In other configurations, clamping force may be applied only on one side of the process axis. For instance, in process configuration E, a clamping force may be generated by magnetizing magnets M1 and M2 and demagnetizing the other magnets M3 to M6. Such a force might be used to clamp an edge of a stack.

Selected magnets may be magnetized simultaneously or sequentially. The magnets may be magnetized sequentially, for instance, if input energy is insufficient to magnetize all of the permanent magnets M1 to M6 at the same time. Consider process configuration D. To have magnets M1, M3, M4 and M6 achieve a specified clamping force magnet M1 may be magnetized first, followed by magnet M6, then magnet M4, and them magnet M3.

Figure 15:
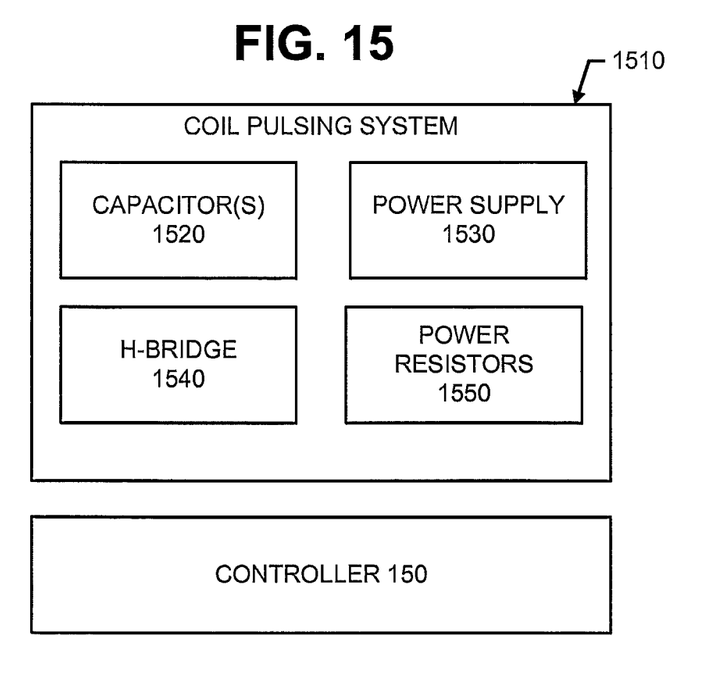
FIG. 15 is an illustration of a system for providing coil currents to a clamp assembly.

Reference is now made to FIG. 15, which illustrates a system 1510 for supplying current to the coils of the magnet devices. The system 1510 includes one or more capacitors 1520 for storing electrical energy. For instance, at least one capacitor 1520 may be provided for each coil of the clamp assembly. A power supply 1530 (e.g., batteries) may be used to charge each capacitor 1520. Each capacitor 1520 may be discharged through a coil by a circuit 1540 such as an H bridge circuit (the H-bridge circuit can control the direction of the capacitor current) to either magnetize or demagnetize its corresponding permanent magnet. A series of power resistors 1550 may be used to regulate capacitor charging and discharging times. The charging and discharging may be controlled by the controller 150.

A clamp assembly herein is not limited to any particular application. As but one example, a clamp assembly herein may be used in a robot system that is configured to perform one or more manufacturing operations.

Figure 16:
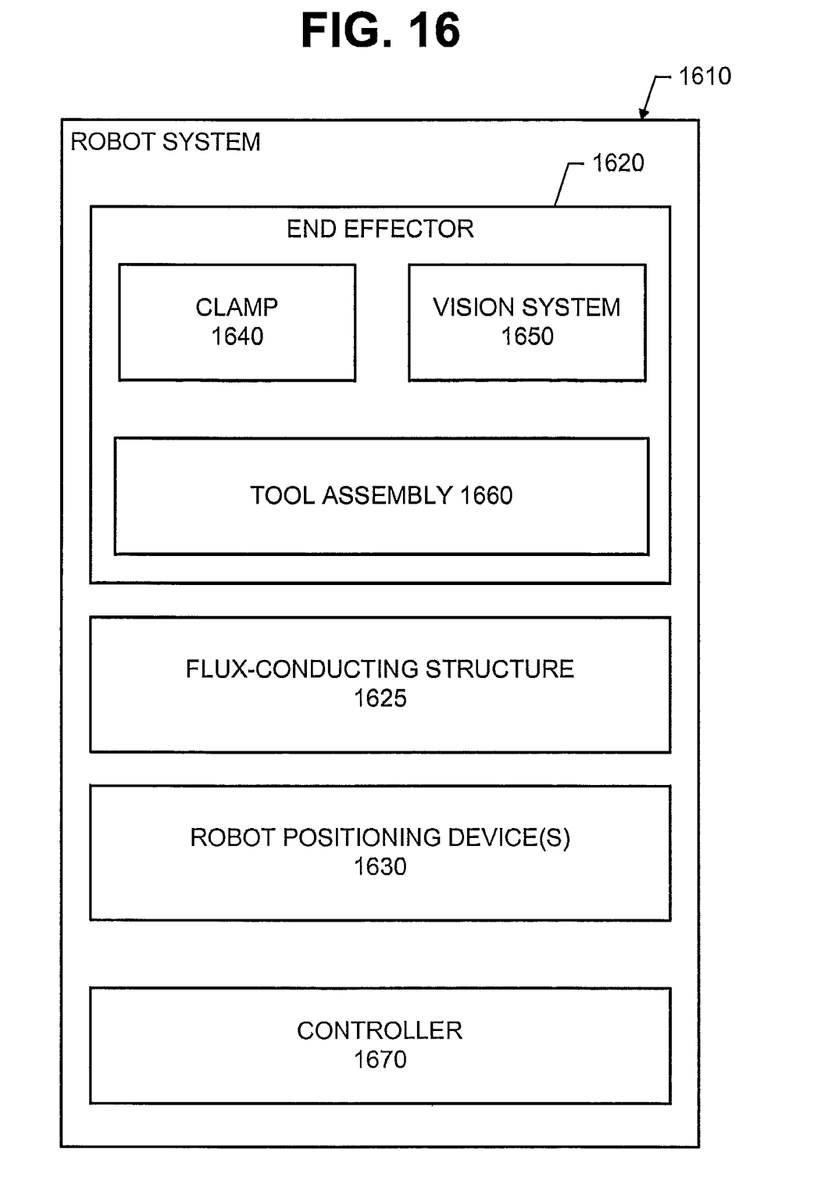
FIG. 16 is an illustration of a robot system including a magnetic clamp assembly.

Reference is now made to FIG. 16, which illustrates a robot system 1610. The robot system 1610 includes an end effector 1620 and a robot 1630 for positioning the end effector 1620. The end effector 1620 includes a clamp 1640, which includes a plurality of magnet devices arranged about a process axis. The robot system 1610 further includes a flux-conducting structure 1625, which may be positioned by the robot 1630 or a separate robot 1630.

The end effector 1620 may be configured to perform one or more manufacturing operations along the process axis. For example, the end effector 1620 may further include a vision system 1650 for accurately positioning the process axis over a target location, and a tool assembly 1660 for performing one or more manufacturing operations along the process axis at the target location. Operation of the robot(s) 1630, clamp assembly 1640, vision system 1650, and tool assembly 1660 may be controlled by a controller 1670. In some embodiments, the controller 1670 may be carried by the end effector 1620 or robot 1630.

That which is claimed is:

1. A method of clamping a stack, the method comprising:
   positioning permanent magnets against a first surface of the stack;
   placing a flux-conducting structure against a second surface of the stack; and
   applying external magnetic field pulses to the permanent magnets to magnetize and demagnetize the permanent magnets,
   wherein applying external magnetic field pulses to the permanent magnets to magnetize the permanent magnets comprises promoting magnetic domain alignment within the permanent magnets sufficient to clamp the stack between the permanent magnets and the flux conducting structure;
   wherein applying external magnetic field pulses to the permanent magnets to demagnetize the permanent magnets comprises demoting magnetic domain alignment within the permanent magnets sufficient to reduce a clamping force applied to the stack by the flux-conducting structure and the permanent magnets;

wherein applying external magnetic field pulses is performed in a first direction for magnetizing the permanent magnets; and wherein applying external magnetic field pulses is performed in a second direction for demagnetizing the permanent magnets, the second direction being opposite the first direction.

2. The method of claim 1, wherein the permanent magnets are positioned about a process axis.

3. The method of claim 1, wherein pulse duration is on the order of milliseconds, and clamping cycle is at least ten seconds.

4. The method of claim 1, wherein the flux-conducting structure includes a plate for providing a flux path.

5. The method of claim 1, wherein the flux-conducting structure includes a plurality of second magnet devices aligned with the permanent magnets.

6. The method of claim 1, wherein the permanent magnets are disposed in a robot end effector.

7. The method of claim 6, wherein applying external magnetic field pulses to the permanent magnets is performed selectively by a controller.

8. The method of claim 6, wherein positioning permanent magnets against a first surface of the stack is performed by at least one robot.

9. The method of claim 1, wherein applying external magnetic field pulses comprises applying a single external magnetic field pulse.

10. The method of claim 1, wherein applying external magnetic field pulses comprises applying at least two external magnetic field pulses.

11. The method of claim 1 further comprising modulating either magnitude or duration of the external magnetic field pulses during magnetization to alter a peak current attained by the pulse.

12. The method of claim 1, wherein applying external magnetic field pulses to the permanent magnet comprises applying external magnetic field pulses to less than all of the permanent magnets.

13. The method of claim 1, wherein applying external magnetic field pulses is performed simultaneously for all of the permanent magnets.

14. The method of claim 1, wherein the permanent magnets are demagnetized prior to being positioned against a first surface of the stack.

* * * * *